United States Patent [19]

Favre et al.

[11] 4,143,088
[45] Mar. 6, 1979

[54] RAPIDLY CURABLE, STORAGE-STABLE ORGANOSILICON COMPOSITIONS

[75] Inventors: Georges Favre, Serezin; André Gibard, Venissieux; Michel Letoffé, Sainte Foy les Lyon, all of France

[73] Assignee: Rhone-Poulenc Industries, Paris, France

[21] Appl. No.: 780,913

[22] Filed: Mar. 24, 1977

[30] Foreign Application Priority Data

Mar. 24, 1976 [FR] France .................................. 76 08528

[51] Int. Cl.$^2$ ........................ C08L 19/00; C08L 83/06
[52] U.S. Cl. .................................. 260/825; 260/824 R
[58] Field of Search ................................ 260/825, 824

[56] References Cited

U.S. PATENT DOCUMENTS

| 3,686,357 | 8/1972 | Cheeseman | 260/825 |
| 3,922,246 | 11/1975 | Ceyzeriat et al. | 260/825 |
| 3,983,265 | 9/1976 | Letoffe | 260/825 |

*Primary Examiner*—Allan Lieberman
*Attorney, Agent, or Firm*—Bacon & Thomas

[57] ABSTRACT

An organosilicon composition is disclosed which is storage-stable in the absence of moisture and is rapidly curable into elastomers with self-adherent properties in the presence of water at room temperature. Such compositions are prepared by mixing:
  (a) at least one $\alpha,\omega$-di(hydroxy) diorganopolysiloxane polymer,
  (b) at least one organosilicon resin,
  (c) at least one alkoxylated organosilicon compound, and
  (d) at least one organic titanium derivative.

13 Claims, No Drawings

RAPIDLY CURABLE, STORAGE-STABLE ORGANOSILICON COMPOSITIONS

BACKGROUND OF THE INVENTION

1. Field of the Invention

The present invention relates to improved organosilicon compositions which are prepared from hydroxylated diorganopolysiloxane polymers, organosilicon resins, alkoxylated organosilicon compounds, and organic derivatives of titanium. These compositions are storage-stable in the absence of moisture and are quickly curing into elastomers when they are exposed to normal ambient atmosphere. Furthermore, within the course of their transformation into elastomers they strongly adhere to the materials onto which they have been spread.

2. Description of the Invention

Curable oganosilicon compositions are known to the art which are curable into solid elastic materials at room temperature in the presence of moisture, whereby these materials adhere to the support which has been contacted with said compositions, without previously depositing thereon an adhesion primer. In particular, such compositions are disclosed in the French Pat. Nos. 2,074,144 and 2,076,539 and in the U.S. Pat. No. 3,686,357. The adherent properties of the compositions which are disclosed in these cited patents have been achieved by introduction therein of certain aminoalkylated oganosilicon compounds. Yet this introduction renders the storage-stability of such compositions rather poor and unpredictable. Because of this it is nearly impossible to provide the trade with a ready-to-use composition which consists of but a single component. Compositions which exhibit a better stability are also known and, more particularly, are disclosed in the published French Patent Applications No. 2,142,050, No. 2,251,602 and U.S. Pats. No. 3,922,246 and No. 3,965,280. The compositions according to the French Application No. 2,142,050 are formulated by mixing hydroxylated diorganopolysiloxane polymers, alkylated silanes, titanium chelates and adhesion improving agents, these latter agents being silylated isocyanurates. Yet by introduction of these isocyanurates, no rapid vulcanization times at ambient temperature can be achieved, e.g., periods of less than 2 hours at the surface and less than 18 hours throughout the mass.

In order to achieve rapid vulcanization which is a goal of most elastomer users (to obviate the need for storing large numbers of materials treated with such compositions) accelerators have to be introduced. The French Application No. 2,142,050 thus uses metal derivatives, preferably organic tin derivatives, for this purpose. Since these derivatives have the disadvantage of being toxic and polluting, their presence is desirably avoided, especially in such fields of application where the elastomers come into contact with foods, cosmetic products, pharmaceutical products or the human body.

The compositions which are described in the French Application No. 2,251,602 are quite similar to those of the Application No. 2,142,050; nevertheless, they differ from same in the per weight ratio between the titanium chelates and the alkylated silanes, which is at least 1, whereas it is less than 1 in the Application No. 2,142,050. This particular feature allows one to obtain elastomers having a low modulus. Nonetheless, other than the modulus distinction, the same disadvantages which characterize the compositions of the Application No. 2,142,050 characterize those of the '602 Application as well. Indeed, it has even been shown through experimentation that it is desirable to add to the '602 type compositions, the aforementioned class of silylated isocyanurate adhesion improving agent. Furthermore, these compositions only give rise to elastomers having low modulus, thus preempting the possibility of obtaining elastomers which, e.g., exhibit high hardness and have high tensile strength.

The compositions according to the commonly assigned U.S. Pat. Nos. 3,922,246 and 3,965,280, are obtained by mixing hydroxylated diorganopolysiloxane polymers, organosilicon resins consisting of triorganosiloxyl and siloxyl units, alkoxylated oganosilicon compounds and organic titanium derivatives. In addition to their ability of being converted into self-adhesive elastomers, such adhesive properties being attained without use of complex additives as, e.g., the silylated isocyanurates, same can be converted into elastomers whose mechanical properties vary over a wide range of values. Same also require relatively short curing periods. Nevertheless, it is a desideratum that such curing times be further reduced independently of desired mechanical and adhesive properties.

SUMMARY OF THE INVENTION

It is an object of the present invention to provide oganosilicon composition which are storage-stable and, especially, can be conveniently stored as a ready-to-use preparation.

It is a further object of the present invention to provide such compositions which cure rapidly at ambient atmosphere.

It is a further object of the present invention to provide such compositions which yield elastomers which strongly adhere to surfaces without the aid of any adhesion primer.

It is a further object of the present invention to provide such rapidly curing compositions which do not contain toxic or polluting adjuvants.

In order to accomplish the foregoing objects according to the present invention, there is provided an improved organosilicon composition which is storage-stable in the absence of water and is curable into elastomers in the presence of water at room temperature, and which comprises and can be prepared by mixing:

(a) 100 parts by weight of at least one $\alpha,\omega$-di(hydroxy)diorganopolysiloxane polymer [A] having a viscosity of at least 600 cps at 25° C. and essentially consisting of diorganosiloxy units of the formula $R_2SiO$ wherein each substituent R is the same or different and represents an alkyl or halogenoalkyl group containing 1 to 8 carbon atoms, a cycloalkyl or halogenocycloalkyl group containing 3 to 8 carbon atoms, an alkenyl group containing 2 to 4 carbon atoms, an aryl or halogenoaryl group containing 6 to 8 carbon atoms or a cyanoalkyl group containing 3 to 4 carbon atoms, and wherein at least 50% of all the substituents R represent methyl;

(b) 8.1 to 60 parts by weight of at least one organosilicon resin [B] essentially consisting of units of the formulae $SiO_2$ and $R'_3SiO_{0.5}$ wherein each substituent R' is the same or different and represents an alkyl or halogenoalkyl group containing 1 to 3 carbon atoms, a vinyl group or a phenyl group, and wherein the molar ratio between the $R'_3SiO_{0.5}$ units and the $SiO_2$ units is from 0.4:1 to 1.2:1;

(c) 2 to 25 parts by weight of at least one alkoxylated organosilicon compound [C] which is selected from the group consisting of monomer compounds [F] of formula (C₁)

$R_xSi[(OCH_2CH_2)_aOR'']_{4-x}$ wherein R is as defined above for the α,ω-di(hydroxy) diorganosiloxane polymers [A], R'' represents an alkyl group containing 1 to 4 carbon atoms, "a" represents zero or 1 and "x" represents zero, 1 or 2; and polymers [G] which are obtained by partial hydrolysis or monomers of formula Si(OR'')₄ wherein R'' is as defined above for the compounds [F], with the proviso that, when employing those difunctional monomers of the formula [F] wherein x is 2, the same are necessarily admixed with either other monomers of the formula [F] wherein x is either 0 or 1, and/or with the aforesaid polymers resulting from partial hydrolysis of the Si(OR'')₄ monomers, and with the further proviso that such admixtures comprise at most 40% of difunctional monomers; and (d) 0.5 to 18 parts by weight of at least one organic titanium derivative [D] which is selected from the group consisting of monomers [H] of the formula $Ti[(OCH_2CH_2)_bOR''']_4$ wherein b represents zero, 1 or 2 and R''' represents an alkyl group which contains 2 to 12 carbon atoms if b equals zero and which contains 1 to 4 carbon atoms if b equals 1 or 2; polymers [I] which are obtained by partial hydrolysis of monomers of the formula Ti(OR''')₄ wherein R''' represents an alkyl group containing 2 to 12 carbon atoms; and titanium chelates [J] which are selected from the group of compounds of the formula (D₁)

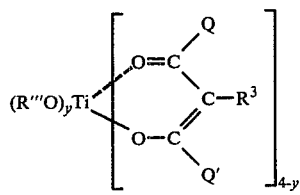

(D₁)

wherein R''' represents an alkyl group containing 2 to 12 carbon atoms and y is 2 or 3, Q represents hydrogen, an alkyl group containing 1 to 4 carbon atoms, a phenyl group, an alkoxy group containing 1 to 5 carbon atoms or a dialkylamino group, the alkyl groups of which each contain 1 to 3 carbon atoms, R³ represents hydrogen, methyl, chloromethyl or acetyl, Q' represents an alkyl group containing 1 to 5 carbon atoms or chloromethyl, or wherein Q is either hydrogen or an alkoxy group containing 1 to 5 carbon atoms, R³ and Q' together with the carbon atoms from which they depend can be linked to form a phenyl nucleus, and compounds of formula (D₂)

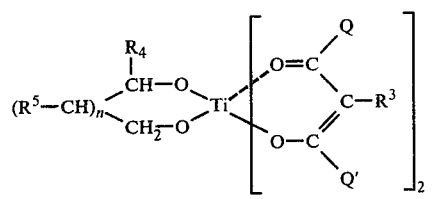

(D₂)

wherein R⁴ and R⁵ each are the same or different and each represents hydrogen or methyl, n represents zero, 1 or 2 and Q, Q' and R³ are as defined above for formula (D₁).

The new organosilicon compositions according to the present invention are significantly distinguished from those which are described in the U.S. Pat. Nos. 3,922,246 and 3,965,280, by their differing per weight contents of certain components, and in other important respects. Surprisingly, these new compositions according to the present invention require only very short vulcanization time periods and at the same time exhibit the desired mechanical properties, as well as good adhesive properties.

Further objects, features and advantages of the invention will become apparent from the detailed description of the invention and its preferred embodiments which follow.

DETAILED DESCRIPTION OF THE INVENTION

The α,ω-dihydroxy-diorganopolysiloxane polymers (A) which are used for the preparation of the compositions of the invention have a viscosity of at least 600 cps at 25° C. and preferably at least 5,000 cps at 25° C.; they comprise oils having a relatively low viscosity of from about 600 cps to about 50,000 cps at 25° C., viscous oils having a viscosity of from about 50,000 cps to about 1 million cps at 25° C., and rubbers having a higher viscosity which can exceed 50 million cps at 25° C. These polymers consist essentially of diorganosiloxy groups of the formula R₂SiO, but the presence of monoorganosiloxy groups of the formula RSiO₁.₅ in the proportion of at the most 2% of the number of units, is not excluded.

By way of illustration of radicals which are represented by the symbols R of type (1), i.e. alkyl and halogenoalkyl containing 1 to 8 carbon atoms, type (2) i.e. cycloalkyl and halogenocycloalkyl containing 3 to 8 carbon atoms, type (3) i.e. alkenyl containing 2 to 4 carbon atoms, type (4) i.e. aryl and halogenoaryl containing 6 to 8 carbon atoms, and (5) i.e. cyanoalkyl containing 3 to 4 carbon atoms, there may be mentioned:

type (1): methyl, ethyl, propyl, isopropyl, butyl, pentyl, 2-ethylbutyl, hexyl, 2-ethylhexyl, octyl, chloromethyl, fluoromethyl, 3,3,3-trifluoropropyl, 4,4,4-trifluorobutyl, 4,4,4,3,3-pentafluorobutyl, 5,5,5,4,4,3,3-heptafluoropentyl and 8,8,8,7,7-pentafluorooctyl radicals.

type (2): cyclopropyl, cyclopentyl, cyclohexyl, methylcyclohexyl, methylcycloheptyl, 2,2-dichloro-cyclopropyl, 2,2-difluorocyclopropyl, 2,3-difluorocyclobutyl, 2,3-dichloro-cyclopentyl, 3,4-difluorocyclohexyl and 3,4-difluoro-5-methylcycloheptyl radicals.

type (3): vinyl, allyl, and 2-butenyl radicals.

type (4): phenyl, tolyl, xylyl, chlorophenyl, dichlorophenyl, trichlorophenyl, tetrachlorophenyl and trifluoromethylphenyl radicals.

type (5): β-cyanoethyl and γ-cyanopropyl radicals.

These polymers (A) are commercially available from silicone manufacturers, and processes for producing them are well known. One of the most commonly used techniques comprises two phases. A first phase comprises polymerizing diorganocyclopolysiloxanes using catalytic quantities of alkaline agents or acids, then treating the polymerizates with calculated quantities of water (see French Pat. Nos. 1,134,005, 1,198,749 and 1,226,745), whereby the quantities of water which are introduced are larger when the polymers having a lower viscosity are to be prepared. Thereafter, in a second phase, the polymers are isolated by eliminating, at a temperature usually above 100° C. and under a pressure preferably below atmospheric pressure, the initial diorganocyclopolysiloxanes equilibrating the reaction, as well as the other polymers of fairly low molecular weight which are formed during this reaction. It is recommended that the alkaline or acid agents which are used as polymerization catalysts are neutralized before distilling off the volatile products.

In order to provide for a more rapid curing of the compositions according to the present invention, it is in general advantageous to use polymers (A) the viscosity of which is at the most a few million cps at 25° C.; however, the use of rubbers having fairly high viscosities, for example 30 million cps at 25° C., can be envisaged conjointly with the use of alkoxylated organosilicon compounds (C) and very reactive organic derivatives of titanium (D). Moreover, mixtures of polymers (A) which are prepared by combining polymers of very different molecular weights, and thus also having very different viscosities, are perfectly suitable.

The organosilicon resins (B), essentially consisting of units of the formulas $R'_3SiO_{0.5}$ and $SiO_2$, are used in portions of 8.1 to 60 parts, and preferably 15 to 50 parts, per 100 parts of the diorganopolysiloxane polymers (A). The molar ratio between the number of $R'_3SiO_{0.5}$ units and the number of $SiO_2$ units is within the range of 0.4:1 to 1.2:1, and preferably 0.5:1 to 1.1:1.

By way of illustration of alkyl and halogenoalkyl radicals having from 1 to 3 carbon atoms, represented by the symbol R', there may be mentioned the methyl, ethyl, isopropyl, n-propyl, chloromethyl, fluoromethyl, 2-fluoroethyl and 3,3,3-trifluoropropyl radicals.

As actual examples of units represented by the formula $R'_3SiO_{0.5}$ may be mentioned those corresponding to the following formulas: $(CH_3)_3SiO_{0.5}$, $(CH_2Cl)(CH_3)_2SiO_{0.5}$, $C_2H_5(CH_3)_2SiO_{0.5}$, $(C_2H_5)_2CH_3SiO_{0.5}$, $(C_2H_5)_3SiO_{0.5}$, $CH_2=CH(CH_3)_2SiO_{0.5}$, $C_3H_7(CH_3)_2SiO_{0.5}$ and $C_6H_5(CH_3)_2SiO_{0.5}$.

These resins can be readily prepared from triorganohalogenosilanes and/or hexaorganodisiloxanes and sodium silicates, as is described in French Pat. No. 1,046,736, or from alkyl silicates and triorganohalogenosilanes, as is described in French Patent 1,134,005. The reaction is carried out in inert diluents and solution of the thus prepared resins in these diluents are stored. However, at the end of the operations it is possible to replace the latter diluents, totally or partly, by other equally inert diluents. As appropriate diluents, there may be mentioned, for example, toluene, xylene, cyclohexane, methylcyclohexane and chlorobenzene. The use of any concentration of resins in these solutions is possible, but it is convenient to use concentrations of about 20 to 75%; these resins contain a variable amount of hydroxyl groups which are bonded to silicon atoms, and generally this amount is within the range of 0.5 to 6%.

The alkoxylated organosilicon compounds (C) are incorporated into the compositions of the invention in amounts of 2 to 25 parts, and preferably 3 to 20 parts, per 100 parts of α,ω-dihydroxy-diorganopolysiloxane polymers (A).

They are selected from a group of compounds comprising monomers of the formula ($C_1$), $R_xSi[(OCH_2CH_2)_aOR'']_{4-x}$, and polymers obtainable by the partial hydrolysis of monomers of the formula $Si(OR'')_4$.

The examples of radicals represented by the symbols R have already been given in the above paragraph dealing with the αω-dihydroxy-diorganopolysiloxane polymers (A).

By way of illustration of alkyl radicals having 1 to 4 carbon atoms represented by the symbol R'', there may be mentioned the methyl, ethyl, propyl, isopropyl and n-butyl radicals.

As actual examples of alkoxylated organosilicon monomers which can be used, there may be mentioned the following: methyltrimethoxysilane, methyltriethoxysilane, methyltriisopropoxysilane, chloromethyltrimethoxysilane, chloromethyltriethoxysilane, fluoromethyltriethoxysilane, methyl-tris-(β-methoxyethoxy)-silane, ethyltrimethoxysilane, ethyltriethoxysilane, n-propyltrimethoxysilane, n-propyl-tris-(β-methoxyethoxy)-silane, 4,4,4,3,3-pentafluoro-butyltrimethoxysilane, hexyltrimethoxysilane, 2-ethyl-hexyltrimethoxysilane, vinyltrimethoxysilane, vinyltriethoxysilane, allyltrimethoxysilane, 2-butenyl-triethoxysilane, 2,2-dichloro-cyclopropyltriethoxysilane, 2,2-difluoro-cyclopropyltriethoxysilane, cyclopentyltrimethoxysilane, cyclohexyltriethoxysilane, 2,3-dimethylcyclohexyltrimethoxysilane, phenyltrimethoxysilane, phenyltris-(β-methoxyethoxy)-silane, trichlorophenyltrimethoxysilane, tetrachlorophenyltriethoxysilane, chloromethyl-methyldimethoxysilane, chloromethyl-methyldiethoxysilane, dimethyldimethoxysilane, methyl-n-propyldimethoxysilane, (2,2-dichlorocyclo-propyl)-methyldimethoxysilane, (2,2-difluoro-cyclopropyl)methyldiethoxysilane, (2,2-dichloro-cyclopropyl)-methyldiethoxysilane, fluoromethyl-methyldiethoxysilane, fluoromethylmethyldimethoxysilane, methyl silicate, ethyl silicate, propyl silicate, isopropyl silicate, butyl silicate, β-methoxyethyl silicate, β-ethoxyethyl silicate, mixed methyl and ethyl silicates and mixed methyl and butyl and butyl silicates.

The polymers which are obtained by the partial hydrolysis of silicates of the formula $Si(OR'')_4$ (for example methyl, ethyl, propyl and butyl silicates, and mixed methyl and ethyl silicates) comprise a major portion of units of the formula $OSi(OR'')_2$ and a small proportion of units of the formulas $(R''O)_3SiO_{0.5}$, $R''OSiO_{1.5}$ and $SiO_2$. Usually these polymers, which are called polysilicates, are defined by their content of alkoxy groups or of silica, and preferably they are defined by their content of silica, since it is often easier to determine the silica (by total hydrolysis of a sample) than the alkoxy groups. Methods for their preparation are well known; such methods are described, in particular, in "Chemistry and Technology of Silicones" by W. Noll, pages 648 to 653.

However, in order to be compatible and/or able to react with the other ingredients which are used for the preparation of the compositions according to the present invention, the thus prepared polysilicates must, be soluble enough in common hydrocarbon solvents such as toluene, xylene and methylcyclohexane, so that at least 50 parts of polysilicates can be dissolved in 100 parts of the solvents.

One of the monomers and/or organosilicon polymers [C] alone or mixtures thereof can be used. however, difunctional monomers [F'], that is, compounds of the above formula [C], wherein x represents 2, have to be used in combination with other tetrafunctional and trifunctional monomers [F] that is, compounds of the formula [C'], wherein x represents zero and 1 and/or the polymers which are obtained by partial hydrolysis of monomers of the formula Si(OR")$_4$. These combinations contain, at the most, 40% of difunctional monomers, and preferably from 3 to 30%.

The difunctional monomers which are present in the compositions according to the present invention play the role of chain extenders, mainly for the α,ω-di(hydroxy) diorganopolysiloxane polymers [A]. This capability of lengthening the diorganopolysiloxane chains allows to obtain elastomers having good mechanical properties and in particular, a good creep resistance of polymers [A] of low viscosity (ranging from, for example, 5,000 cps to 40,000 cps at 25° C.).

The organic titanium derivatives [D] are used in amounts of 0.5 to 18 parts, and preferably 0.8 to 15 parts, per 100 parts of α,ω-di(hydroxy) diorganopolysiloxane polymers [A]; these derivatives are selected from a group of compounds comprising the monomers [H] of the formula Ti[(OCH$_2$CH$_2$)$_b$OR''']$_4$, the polymers [I] obtainable by the partial hydrolysis of alkyl titanates of the formula Ti(OR''')$_4$, and the chelates of the formulae (D$_1$) and (D$_2$).

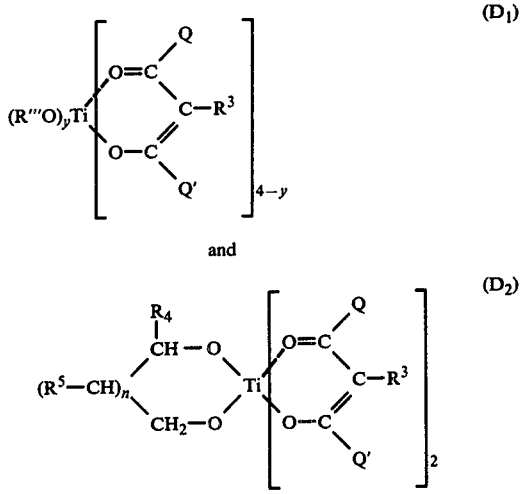

By way of illustration of alkyl radicals containing 1 to 12 carbon atoms which are represented by the symbols R''', there may be mentioned the methyl, ethyl, propyl, isopropyl, butyl, isobutyl, hexyl, 2-ethylhexyl, octyl, decyl and dodecyl radicals.

By way of illustration of alkyl radicals containing 1 to 4 carbon atoms, alkoxy radicals containing 1 to 5 carbon atoms and dialkylamino radicals, the alkyl groups of which bond to the nitrogen atom and contain 1 to 3 carbon atoms, which are represented by the symbol Q, there may be mentioned the methyl, ethyl, propyl, isopropyl, butyl, methoxy, ethoxy, propoxy, isopropoxy, butoxy, pentoxy, dimethylamino, diethylamino and dipropylamino radicals.

By way of illustration of alkyl radicals containing 1 to 5 carbon atoms which are represented by the symbol Q', there may be mentioned the methyl, propyl, isopropyl, butyl and pentyl radicals.

As actual examples of monomers [H], there may be mentioned ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate and the titanate of the formula Ti[OCH$_2$CH$_2$)$_2$OCH$_3$]$_4$.

Polymers [I] which are obtained by partial hydrolysis of titanates of the formula Ti(OR''')$_4$ (for example isopropyl, butyl and 2-ethyl-hexyl titanates) comprise linear structures which each consist of a series of units of the formula $$\begin{array}{c} \text{OR}''' \\ | \\ -\text{TiO}- \\ | \\ \text{OR}''' \end{array}$$

and/or more complex structures such as are indicated in the work "The Organic Chemistry of Titanium" by R. Feld and P. L. Cowe, on pages 25 to 31. The structures of these polymers (which are called polytitanates) are strictly depending on the value of the molar ratio between the initial reagents (that is to say the alkyl titanates and water), the nature of the R''' radicals and the reaction conditions of the hydrolysis.

To define these polytitanates it is preferable to refer to their titanium oxide content which is determined by total hydrolysis of samples. They must also be stable and soluble in the common hydrocarbon solvents (in amounts of at least 50 parts of polytitanates per 100 parts of solvents).

The titanium chelates of the formula (D$_1$) are prepared by reacting alkyl titanates of the formula Ti(OR''')$_4$ with chelating agents which are selected from the group of β-diketones, the β-keto-esters, the β-keto-amides and the substituted phenolic derivatives. The ketone derivatives correspond to the general formula Q'CO-CH(R$^3$)COQ and the phenolic derivatives to the general formula

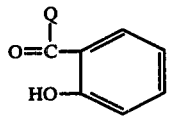

As actual examples of β-diketones, there may be mentioned those corresponding to the following formulae:
CH$_3$CO-CH$_2$-CO-CH$_3$, CH$_3$(CH$_2$)$_2$CO-CH$_2$-COCH$_3$, (CH$_3$)$_2$CH-CO-CH$_2$-CO-CH$_3$, CH$_3$(CH$_2$)$_4$COCH$_2$COCH$_3$,

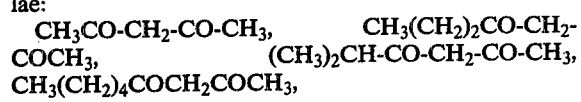

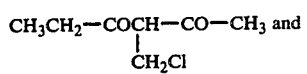

as β-keto-esters and β-keto-amides, those corresponding to the following formulae: CH$_3$COCH$_2$COOCH$_3$, CH$_3$COCH$_2$COOC$_2$H$_5$ and CH$_3$COCH$_2$CON(C$_2$H$_5$)$_2$, and as substituted phenolic derivatives, salicylaldehyde, and methyl, ethyl and propyl salicylates.

These chelates are obtained by simply mixing the reagents in amounts of 1 to 2 mols of chelating agents per mol of alkyl titanates; the alcohol, R'''OH, which is formed thereby can be removed, but its presence in the compositions is not objectionable if the latter are cured in the open air, or in ventilated premises.

Details on the reaction conditions are published in the work of R. Feld and P. L. Cowe mentioned above, on pages 58 to 66.

It is particularly advantageous to use liquid chelates or chelates having fairly low melting points, in order to facilitate this contact with the ingredients [A], [B] and [C]. Such chelates correspond, for example, to the formulae below:

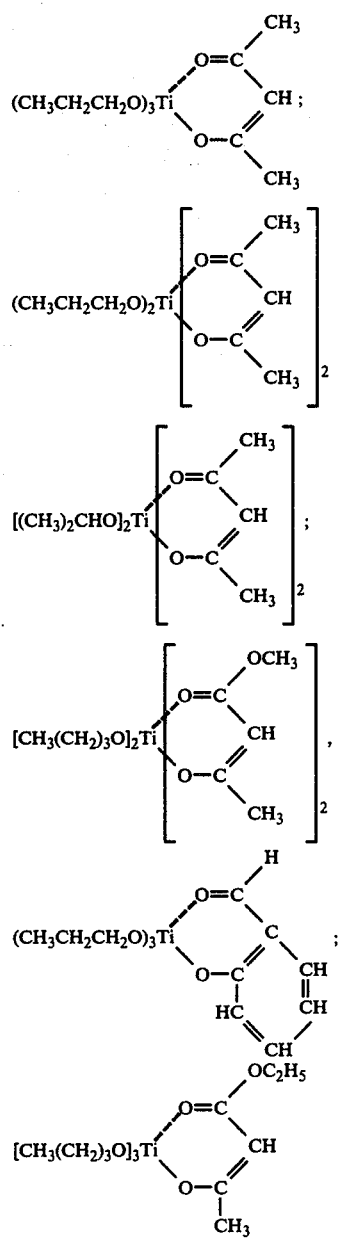

The chelates of the formula (D₂) are prepared according to the process which is disclosed in French Pat. No. 2,121,289, by the reaction of such dialkoxy-titanium chelates of the formula (D₁), wherein y is 2, with alkanediols such as ethylene glycol, 1-methyl-ethanediols, 1,3-propanediol, 1-methyl-1,3-propanediol and 2-methyl-1,3-propanediol.

As examples of chelates of the formula (D₂) there may be mentioned those corresponding to the formlae below:

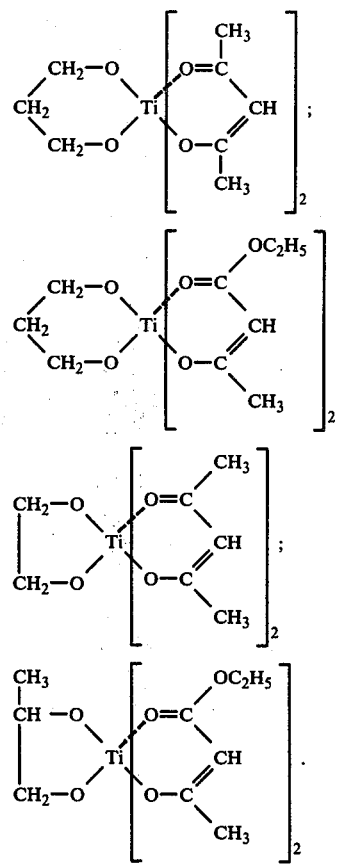

Further to the ingredients [A], [B], [C] and [D], conventional fillers can be used in amounts of, at the most, 100 parts, and preferably 5 to 70 parts, per 100 parts of α,ω-dihydroxydiorganopolysiloxane polymers [A]; these fillers can be chosen from the following products: inorganic materials such as pyrogenic silica, precipitated silica and diatomaceous silica, ground quartz, aluminium silicates, mixed aluminium and magnesium silicates, zirconium silicate, mica powder, calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium and magnesium, the different forms of alumina (hydrated or anhydrous) graphite, conducting or non-conducting lamp blacks, asbestos and calcined clay and organic materials such as the phthalocyanines, cork powder, sawdust, synthetic fibres and synthetic polymers (polytetrafluoroethylene, polyethylene, polypropylene, polystyrene and polyvinyl chloride).

These fillers, and more especially the fillers of inorganic origin, can optionally be surface-modified by treatment with the organosilicon compounds usually employed for this purpose, such as the diorganocyclopolysiloxanes, the hexaorganodisiloxanes, hexamethyldisilazane and the diorganocyclopolysilazanes (French Pat. Nos. 1,126,884, 1,136,885 and 1,236,505 and British Pat. No. 1,024,234). The fillers which are modified in this way, contain, in most cases, from 3 to 30% by weight of organosilicon compounds.

The introduction of fillers has the result of improving the tensometric properties of the elastomers. It is possible to introduce a single type of filler or mixtures of several types. The quantities employed depend upon the nature of the fillers and the properties desired; when using finely divided fillers such as pyrogenic and precipitated silicas, it is advisable to introduce at the most 40 parts thereof per 100 parts of polymers [A], when using coarser fillers such as ground quartz and diatomaceous silica, it is possible to introduce up to 70 parts thereof per 100 parts of polymers [A], and when using fillers of another nature or a different particle size, it is possible to introduce up to 100 parts thereof per 100 parts of polymers [A].

It is possible to use inorganic or organic pigments together with these fillers, as well as agents for improving the flame resistance of the elastomers, for example organic halogen derivatives, organic phosphorus derivatives and platinum derivatives. These pigments and agents together represent, at the most, 20% by weight of the fillers.

Other additives can also be used. Their presence, amongst the various ingredients which enter into the preparation of the compositions according to the present invention, affects, to a greater or lesser extent, the physical characteristics of the compositions and the mechanical properties of the elastomers which result from the curing of the compositions. In particular, these additives can play the role of plasticizers (in decreasing the hardness of the elastomers, and producing more supple, non-sticky compositions), stabilizers (little change in viscosity during storage and ensurance of equal curing times), thixotropic agents (to avoid any flow vertical jointings) and extrusion aids (to facilitate the discharge of compositions which are packed in tubes which have a nozzle shaped outlet, at one end).

These additives are chosen from the group consisting of compound from the following groups [K] [L], [M] [N] and [O]: [K]: α,ω-bis triorganosiloxy-diorganopolysiloxane and/or α-hydroxy-ω-triorganosiloxy-d:organopolysiloxane polymers having a viscosity of at least 10 cps at 25° C., which are formed essentially from diorganosiloxy units and at most 1% of monoorganosiloxy units, the organic radicals bonded to the silicon atoms being chosen from the group comprising methyl, vinyl and phenyl radicals, whereby at least 60% of these organic radicals are methyl radicals.

The viscosity of these polymers can attain several hundred million cps at 25° C. and, therefore, they comprise fluid and viscous oils as well as soft and hard rubbers. They are prepared in accordance with the usual techniques which e.g. are described more precisely in the French Pat. Nos. 978,058, 1,025,150, 1,108,764 and 1,370,884. It is preferable to use α,ω-bis-trimethylsiloxy-dimethylpolysiloxane oils having a viscosity of about 10 cps to about to about 1,000 cps at 25° C. These polymers can be introduced in amounts of at the most 150 parts, and preferably from 5 to 120 parts, per 100 parts of α,ω-dihydroxy-diorganopolysiloxane polymers [A];

[L]: liquid, branched methylpolysiloxane polymers having 1.6 to 1.9 organic groups per silicon atom and essentially consisting of a combination of units chosen from the group of units of the formulae $(CH_3)_3SiO_{0.5}$, $(CH_3)_2SiO$ and $CH_3SiO_{1.5}$; they contain from 0.3 to 10% of hydroxyl groups. They can be obtained by hydrolysis of the corresponding chlorosilanes, as shown in French Patent 1,408,662. These polymers can be introduced in amounts of at most 70 parts, and preferably from 3 to 50 parts, per 100 parts of α,ω-dihydroxy-diorganopolysiloxane polymers [A];

[M]: diorganopolysiloxane oils blocked by hydroxyl groups and/or lower alkoxy groups which have a low viscosity, in general of between about 2 cps and about 4,000 cps at 25° C; analogous as for the previously mentioned compounds [K] the organic radicals which are bonded to the silicon atoms of these oils are chosen from the group of methyl, vinyl and phenyl radicals whereby at least 40% of these radicals are methyl radicals. As lower alkoxy groups for chain blocking, there may be mentioned the methoxy, ethoxy, isopropoxy, propoxy, butoxy, isobutoxy and tertiary butoxy groups. The content of hydroxyl and/or alkoxy groups varies according to the molecular weight of the oils as well as the nature of the organic groups bonded to the silicon atoms; they generally are present in amounts of 0.5 to 20%. These oils are prepared according to the usual techniques which e.g. are described in the French Pat. Nos. 938,292, 1,014,674, 1,116,196, 1,278,281 and 1,276,619. They can be introduced in amounts of at most 50 parts, and preferably from 2 to 40 parts, per 100 parts of α,ω-dihydroxy-diorganopolysiloxane polymers [A];

[N]: hydroxylated organosilicon compounds chosen from the group of compounds corresponding to the general formula $G'SiG_2(OSiG_2)_eOH$, which are solid at ambient temperature. In this formula the symbols G, which are identical or different, represent methyl, ethyl, propyl, vinyl or phenyl radicals; the symbol G' represents a hydroxyl radical or G and the symbol e represent zero, 1 and 2.

By the way of actual examples of these compounds there may be mentioned; diphenylsilanediol, methylphenylsilanediol, dimethylphenylsilanol, 1,1,3,3-tetramethyl-disiloxanediol, 1,3-dimethyl-1,3-diphenyl-disiloxanediol, 1,3-dimethyl-1,3-diethyl-disiloxanediol and 1,1,5,5-tetramethyl-3,3-diphenyltrisiloxanediol.

They can be introduced in amounts of at most 30 parts, and preferably from 0.5 to 20 parts, per 100 parts of α,ω-dihydroxy-diorganopolysiloxane polymers [A];

[O]: chelating agents such as those corresponding to the general formulae mentioned above: $Q'COCH(R^3)COQ$ and

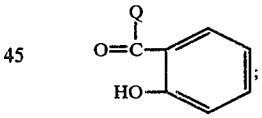

;

they are therefore identical to the β-diketones, β-ketoesters, β-keto-amides and substituted phenolic derivatives which are used for preparing the titanium chelates of the formula ($O_1$). They can be introduced in amounts of at most 30 parts, and preferably from 0.5 to 25 parts, per 100 parts of α,ω-dihydroxy-diorganopolysiloxane polymers [A].

These chelating agents are special stabilizers; in effect they ensure the stability of the compositions when they are subjected to high temperatures in a closed vessel, for example to temperatures of about 150° to about 200° C.

To prepare the compositions according to the present inventin it is recommended that a device is used which allows the various ingredients used in the compositions to be intimately mixed whilst excluding moisture, and at the same time allows the volatile materials present (solvents, water and polymers of low molecular weight) to be evacuated.

The various ingredients can be introduced into the above-mentioned device without following a preferential order of introduction, whereby this introduction may be done at atmospheric pressure or at a lower pressure. However, it is recommended that the operation is carried out in two stages, in order to avoid a sudden thickening of the mixtures, or to avoid obtaining compositions exhibiting a poor storgage-stability and-/or a mediocre tendency to cure when exposed to normal atmosphere. In a first stage, the α, ω-dihydroxy-diorganopolysiloxane polymers [A], the organosilicon resins [B], the fillers if any and the stabilizers and/or plasticizers, if any, are introduced.

The mixture, consisting of these 4 types of ingredients, is then hot-malaxated at a temperature preferably higher than 80° C. and possibly exceeding 150° C., preferably under a pressure less than atmospheric pressure, for a period of time (ranging for example from 30 minutes to 6 hours) sufficient to eliminate the volatile substances such as the solvents in the resins, water and low molecular weight polymers. In this way a stable, homogeneous, anhydrous base composition is obtained.

In a second stage, the alkoxylated organosilicon compounds [C] and the organic derivatives of titanium [D], are added to these base compositions under a dry atmosphere, and preferably at atmospheric pressure. The whole is malaxated at fairly low temperatures, of the order of from 40° C. to 120° C., for the period of time necessary to achieve homogeneous compositions.

Generally a period of time of about 1 hour at 50° C. or some minutes (for example 10 minutes) at 120° C. is suitable; there is no use in heating for a longer period and/or higher temperatures, since the compounds [C] and [D] generally contain neither water nor solvents.

If the presence of chelating agents (such as β-diketones or β-keto-esters) is desired, it is advisable to add these agents at the end of the second stage; after their incorporation, the malaxation is continued for only a few minutes, at the temperatures indicated above. Furthermore, it is particularly advantageous (for obtaining better physical characteristics of the compositions and of the elastomers) to add the organic derivatives of titanium [D] in two stages: the first portion, representing a quantity of between ⅓ and ⅔ of the whole, is introduced at the same time as the organosilicon derivatives [C], and the remaining portion is introduced at the end of the 2nd stage.

The compositions according to the present invention are in the form of storage-stable, mouldable homogeneous pastes, and they have the ability to form elastomers even at ambient temperature in the presence of moisture. The curing proceeds from the exterior to the interior of the mass of the compositions; a skin first forms at the surface, and then the crosslinking continues throughout the mass. The complete formation of the skin (the surface is then no longer sticky to the touch) requires at the most a period of from 1 hour to 2 hours, and the further curing (while handling of the formed elastomers is possible) a period of from 3 to 24 hours.

These compositions can be used for many applications, such as jointings for masonry, caulking for boat decks, gluing of the most varied materials (metals, plastics, natural and synthetic rubbers, wood, cardboard, pottery, brick and glass), coating of woven or non-woven products based on synthetic, organic or inorganic fibres, coating of sheets of metal, plastic or cellulose, and covering of electrical and electronic materials.

For certain applications such as the impregnation of woven or non-woven articles, it is advantageous, and sometimes even necessary, to disperse the compositions of the invention in an inert organic diluent such as toluene, xylene, heptane, White Spirit, cyclohexane, methylcyclohexane, trichloroethylene, tetrachloroethylene, ethyl acetate and butyl acetate. In such dispersions any concentration of these compositions can be used; it has to be chosen with respect to (1) the quantity of liquid which is absorbed by the materials to be treated and (2) the quantity of the composition which is to be deposited on this material in order to provide for the desired effects, for example good waterproofing or good insulating capacity.

The following examples illustrate the invention (the parts and the percentages are expressed by weight):

EXAMPLE 1

In the malaxator are introduced: 100 parts of an α,ω-dihydroxy-dimethylpolysiloxane oil having a viscosity of 60,000 cps at 25° C, 50 parts of a toluene solution containing 60% of a resin which essentially consists of $(CH_3)_3SiO_{0.5}$ and $SiO_2$ units, whereby the numerical ratio between these units is 0.65/1, this resin possessing 2.1% of hydroxyl groups, 8 parts of a α,ω-dihydroxy-methyl-phenylpolysiloxane oil which essentially consists of $(CH_3)_2SiO$ and $(C_6H_5)_2SiO$ units, whereby the numerical ratio between these units is 0.7/1, and which has a viscosity of 3,000 cps at 25° C. and contains 5.1% of hydroxyl groups, and 12 parts of a pyrogenic silica with a specific surface area of 300 $m^2/g$.

The introduction is effected in the order indicated above and the agitated mixture within the malaxator is heated to 140° C. and is maintained at this temperature for 2 hours under a reduced pressure of 15 mm Hg. At the end of this period the heating is cut off, the vacuum is released and a slight stream of nitrogen is circulated in order to protect the contents of the malaxator from the atmosphere.

When the temperature of the mixture has fallen again to about 60° C. 10 parts of ethyl silicate and 1.1 parts of ethyl titanate are introduced into the malaxator; the whole is mixed at 60° C. for 1 hour, whereby the formation of an almost translucent, thixotropic, sticky, homogeneous composition $H_1$ takes place.

Samples of this composition $H_1$ are spread, in a layer of 2 mm thickness, onto glass surfaces previously coated with an anti-adherent agent. The application of this layer takes place at ambient atmosphere, wherein the temperature is substantially 25° C. and the relative humidity is 50%. The layer thus deposited is non-sticky to the touch at the end of one hour's exposure to the atmosphere, and at the end of 10 hours it has been converted, by crosslinking, into a rubbery film which is easily detached. The period of time which is necessary to obtain a non-sticky touch will subsequently be called "tack-free time," and that to obtain a rubbery film will be called "mold-release time."

Other compositions, similar to the previous one, are prepared according to the above-described operating method; however, the 10 parts of ethyl silicate are replaced, totally or partially, by various quantities of alkoxylated organosilicon compounds, and these compounds can be associated with chelating agents. The nature of the alkoxylated organosilicon compounds, the quantities used and the "tack-free times" and "mold-release times" for samples of composition containing these alkoxylated compounds, are indicated in Table I. Each new composition is respectively designated $H_2$, $H_3$, $H_4$, $H_5$, $H_6$, $H_7$ and $H_8$.

TABLE I

| Compositions | Alkoxylated organosilicon compounds Nature | | Quantities | Tack-free time | Mold release time |
|---|---|---|---|---|---|
| $H_2$ | $CH_3Si(OC_2H_5)_3$ | | 12 parts | 1 hr. 20 mins. | 12 hrs. |
| $H_3$ | $CH_3Si(OC_2H_5)_3$<br>$CH_3COCH_2COOC_2H_5)$ | $(a_1)$ | 12 parts<br>1.3 parts | 1 hr. 40 mins. | 14 hrs. |
| $H_4$ | $ClCH_2Si(OC_2H_5)_3$ | | 10.2 parts | 1 hr. | 10 hrs. |
| $H_5$ | $CH_2{=}CHSi(OC_2H_5)_3$ | | 9.15 parts | 1 hr. 30 mins. | 16 hrs. |
| $H_6$ | $CH_3Si(OCH_2CH_2OCH_3)_3$ | | 19.9 parts | 2 hrs. | 17 hrs. |
| $H_7$ | $Si(OC_2H_5)_4$<br>$CH_2\!-\!CH\!-\!SiCH_3(OC_2H_5)_2$<br>$\quad\backslash\ /$<br>$\quad\ CCl_2$ | $(b_1)$ | 11.85 parts<br>2.4 parts | 2 hrs. | 18 hrs. |
| $H_8$ | $Si(OC_2H_5)_4$<br>$ClCH_2SiCH_3(OC_2H_5)_2$ | $(c_1)$ | 11.85 parts<br>1.8 parts | 2 hrs. 10 mins. | 15 hrs. |

($a_1$) The ethyl acetoacetate is not added at the same time as the methyltriethoxysilane, but subsequently during the malaxation period of one hour at 60° C, at about 15 minutes after the beginning of this period.
($b_1$) The dichlorocyclopropylmethyldiethoxysilane is added at the same time as the ethyl silicate.
($c_1$) The chloromethylmethyldiethoxysilane is also added at the same time as the ethyl silicate.

This table shows that the tack-free and mold release times are on the one hand very short and on the other hand lie within a narrow time interval.

By way of comparison, compositions $H'_1$, $H'_2$, $H'_3$, $H'_4$, $H'_5$, $H'_6$, $H'_7$ and $H'_8$ are prepared following the operating method above, except that instead of 50 parts of the toluene solution containing 60% of the resin consisting of $CH_3SiO_{0.5}$ and $SiO_2$ units only 10 parts of this same solution are used. These compositions are deposited on glass surfaces, and then the tack-free and mold release times are measured on the layers which are converted to elastomers; it is found that the tack-free times are, in general, longer than 6 hours and that the mold release times are longer than 24 hours.

Samples of compositions $H_1$, $H_2$, $H_4$ and $H_7$ are then used to make test pieces in accordance with the standard specification from ASA 116-1 1960. For this purpose, assemblies are made up according to the following model: cavities of parallelepiped shape of cross-sectional dimensions 50 × 12.5 × 12.5 mm are formed by means of spacers which are placed between two square plates of aluminum of 50 mm side (placed opposite one another and spaced 12.5 mm apart). Such a cavity runs parallel to the two opposite edges of such a plate, and it is situated in the center of the space between the two plates. Each of the parallelepiped cavities of a batch of the assemblies (manufactured according to the process above) is then filled with samples of compositions $H_1$, $H_2$, $H_4$ and $H_7$. These assemblies are then left for 8 days exposed to ambient atmosphere, (temperature 25° C. relative humidity 50%). At the end of this period of time, the spacers are removed, and the test pieces, each of which consists of two square plates of aluminum and a parallelepiped bar of the elastomer, which adhere to the median zone of each plate over an area of 50 × 12.5 mm, are thus freed and these test pieces are again left for 20 days exposed to the atmosphere.

After this period the batch of test pieces is divided into three substantially equal portions, and the tensile strength as well as the corresponding elongation is measured immediately on the first portion of the test pieces, using a tensometer and following the recommendations which figure in the standard specification from ASA 116-1 1960.

The test pieces from the second and third portions are immersed for 3 days in water at 25° C., whereby those of the third portion are additionally subjected to a tension which imparts to each of them a 15% elongation from the beginning of the immersion. After the 3 days immersion, tensile strength and corresponding elongation of these test pieces are measured in the same way.

All the results are given in Table 2; the tensile strength, expressed in kg/cm², is denoted by TS and the corresponding elongation, expressed in %, is denoted by E%.

TABLE II

| Elastomers formed by curing of the compositions | 1st fraction | | 2nd fraction | | 3rd fraction | |
|---|---|---|---|---|---|---|
| | TS | E% | TS | E% | TS | E% |
| $H_1$ | 5.2 | 250 | 5.2 | 255 | 3.4* | 150 |
| $H_2$ | 3.7 | 340 | 3.5 | 355 | 2.4* | 270 |
| $H_4$ | 2.7 | 475 | 3.1 | 525 | 2.7 | 525 |
| $H_7$ | 7.6 | 360 | 7.5 | 350 | 6.8 | 320 |

*For the test pieces of the 3rd fraction, with regard to $H_1$ and $H_2$, the break is called an adhesive break; it is produced at the interface between the aluminum plate and the elastomer bar; it is therefore a separation. All the other breaks whose measurements feature in this table, are cohesive and they occur within the mass of the elastomer bar.

From the results recorded in this table, it can be deduced that the presence of the $ClCH_2$ group bonded to the silicon in the $ClCH_2Si(OC_2H_5)_3$ crosslinking agent, improves the adhesion to aluminum; this improvement is also obtained by the combination of the difunctional silane

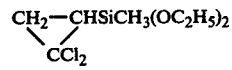

with ethyl silicate.

EXAMPLE 2

4 Compositions, $K_1$, $K_2$, $K_3$ and $K_4$, are prepared, operating according to a process similar to that indicated in Example 1; thus, in a first phase four mixtures are prepared, each by malaxation, for 3 hours at 140° C under a reduced pressure of 30 mm Hg, from the following ingredients: an α,ω-dihydroxy-diorganopolysiloxane oil chosen from amongst those having a viscosity of 40,000, 300,000 or 600,000 cps at 25° C.; if appropriate, an α,ω-bis-triorganosiloxy-dimethylpolysiloxane oil chosen from amongst those having a viscosity of 20 or 80 cps at 25° C; one or several toluene solutions each containing 60% of a resin consisting of triorganosiloxy and siloxy units, an α,ω-dihyddroxymethylphenylpolysiloxane oil having a viscosity of 500 cps at 25° C. or the diphenylsilanediol; and one or several inorganic fillers.

In a second phase, to each of the 4 freshly prepared mixtures (which are cooled to about 90° C and protected from the atmosphere by a stream of dry nitrogen), the following ingredients are added: an alkyl silicate which may or may not be combined with an alkyl polysilicate; an alkyl titanate or polytitanate; and, if appropriate, acetylacetone as a chelating agent.

At the end of the addition of these three types of ingredients, the contents of the malaxator are stirred at 90° C for 10 minutes and are then rapidly cooled to about 25° C. 4 thixotropic, pasty, homogeneous compositions $K_1$, $K_2$, $K_3$ and $K_4$ are recovered.

In Table III below are mentioned the various ingredients used for preparing each composition $K_1$, $K_2$, $K_3$ and $K_4$, and the quantities introduced are given in parts.

Samples of these 4 compositions are then spread, exposed to the atmosphere (temperature 25° C., relative humidity 50%) onto glass surfaces, the deposited layer having a thickness of about 2 mm. The tack-free time and the mold release time for rubbery films formed by curing of these samples, are measured.

Furthermore, the following mechanical properties are measured on the above rubbery films after they have been left (after mold release) exposed to ambient atmosphere for 7 days. Shore hardness in accordance with the standard specification form NF T 51,109 and tensile strength in $kg/cm^2$ (and corresponding elongation in %) in accordance with the standard specification form NF T 46,002, the test pieces used for these measurements being of the dumb-bell type.

All the results are recorded in Table IV which follows:

TABLE III

| Ingredients used | $K_1$ | $K_2$ | $K_3$ | $K_4$ |
|---|---|---|---|---|
| $\alpha,\omega$-Dihydroxy-dimethylpolysiloxane oil of viscosity 40,000 cps at 25° C | 100 | 100 | | |
| $\alpha,\omega$-Dihydroxy-dimethylpolysiloxane oil of viscosity 300,000 cps at 25° C | | | 100 | |
| $\alpha,\omega$-Dihydroxy-dimethyldiphenylpolysiloxane oil, consisting of dimethylsiloxy and diphenylsiloxy units, whereby the numerical ratio between the units is 95/5, viscosity 600,000 cps at 25° C | | | | 100 |
| $\alpha,\omega$-bis-Trimethylsiloxy-dimethylpolysiloxane oil of viscosity 20 cps at 25° C | | | 50 | 70 |
| $\alpha,\omega$-bis-Dimethylvinylsiloxy-dimethylpolysiloxane oil of viscosity 80 cps at 25° C | | 10 | | |
| 60% strength toluene solution of a resin consisting of $(CH_3)_3SiO_{0.5}$ and $SiO_2$ units, whereby the numerical ratio between the units is 0.56/1 and containing 1.5% of hydroxyl groups | 70 | | 60 | 20 |
| 60% strength toluene solution of a resin consisting of $(CH_3)_3SiO_{0.5}$, $(CH_3)_2CH=CHSiO_{0.5}$ and $SiO_2$ units, whereby the numerical ratio between the units is 0.65/0.15/1 and containing 1.2% of hydroxyl groups | | 45 | | |
| 60% strength toluene solution of a resin consisting of $(CH_3)_3SiO_{0.5}$, $(CH_3)_2n \cdot C_3H_7SiO_{0.5}$ and $SiO_2$ units, whereby the numerical ratio between the units is 0.35/0.15/1 and containing 1.3% of hydroxyl groups | | | | 15 |
| $\alpha,\omega$-Dihydroxy-methylphenylpolysiloxane oil consisting of $CH_3(C_6H_5)SiO$ units, viscosity 500 cps at 25° C | 6 | | 10 | 6 |
| Diphenylsilanediol | | 3 | | |
| Pyrogenic silica of specific surface area 130 $m^2/g$ | | | 15 | 17 |
| Pyrogenic silica of specific surface area 300 $m^2/g$ | 15 | 15 | | |
| Calcium carbonate of average particle diameter 0.15 microns | 5 | | 5 | |
| Ethyl silicate | 10 | | | 14 |
| Ethyl polysilicate containing 40% of silica | 5 | | | 2 |
| Methyl silicate | | | 16 | |
| n-Propyl silicate | | 18.5 | | |
| Ethyl titanate | | | 3 | 3 |
| Butyl titanate | 3 | | | |
| Butyl polytitante containing 33% of titanium oxide | | 5+7.5 (a$_2$) | | |
| Acetylacetone | | 7.5 (b$_2$) | | 3 |

(a$_2$) The butyl titanate is added in two portions: 5 parts at the same time as the 18.5 parts of n-propyl silicate, and 7.5 parts at the end of the 10 minute malaxation period at 90° C. To assist the incorporation of the 7.5 parts, the malaxation is continued for 5 minutes at 90° C.

(b$_2$) and (c$_2$) The acetylacetone is added at the end of the 10 minute period of malaxation at 90° C. As above, the malaxation is continued for 5 minutes at 90° C.

TABLE IV

| Elastomers obtained by curing of the compositions | Tack-free time | Mold Release time | Mechanical properties on film of 2mm thickness | | |
|---|---|---|---|---|---|
| | | | Shore hardness | Tensile strength(kg/cm$^2$) | Corresponding elongation in % |
| K$_1$ | 1 hr. 20 mins. | 14 hrs. | 32 | 41 | 440 |
| K$_2$ | 1 hr. 30 mins. | 15 hrs. | 30 | 31 | 550 |
| K$_3$ | 50 mins. | 10 hrs. | 9 | 10 | 480 |
| K$_4$ | 1 hr. 45 mins. | 14 hrs. | 7 | 11 | 650 |

Finally, assemblies convertible to test pieces which conform to the standard specification form ASA 116-1 1960, are made by the method indicated in Example 1, using compositions K$_1$, K$_2$, K$_3$ and K$_4$ and square plates of dimensions 50 × 50 mm (chosen from glass, aluminum, wood, brass and polycarbonate).

This assembly batch is left exposed to ambient atmosphere for 8 days; after the completion of the filling stage of the parallelepiped cavities of dimensions 50 × 12.5 × 12.5 mm; at the end of this period the test pieces are freed by removing the spacers; they are left for 20 days, still exposed to the atmosphere, and the batch of test pieces is divided into three substantially equal portions.

The tensile strength and the corresponding elongation is measured immediately for the test pieces of the first portion. The test pieces of the second portion are immersed for 3 days in water at ambient temperature, and after this immersion period their tensile strength as well as their corresponding elongation is measured. The test pieces of the third portion are immersed for 4 days in water at ambient temperature, and at the end of this period, the test pieces are withdrawn from the water and then subjected to a tension which imparts an elongation of 150% to them; if after 24 hours of exposure to the atmosphere under these conditions there has been no rupture of the elastomer or detachment from the elastomer-substrate interface, the test pieces are said to be suitable.

The results are recorded in Table V; the tensile strength, expressed in kg/cm$^2$, is designated by TS, and the corresponding elongation, expressed in %, is designated by E%.

TABLE V

| Elastomers obtained by curing of the compositions | Nature of the test piece plates | 1st portion TS | 1st portion E% | 2nd portion TS | 2nd portion E% | 3rd portion |
|---|---|---|---|---|---|---|
| K$_1$ | glass | 8.1 | 170 | 7.5 | 155 | not suitable |
| | aluminum | 8 | 150 | 7.3 | 165 | not suitable |
| K$_2$ | glass | 6.6 | 220 | 6.8 | 240 | suitable |
| | aluminum | 7 | 230 | 7 | 230 | suitable |
| K$_3$ | wood | 2.5 | 300 | 3 | 350 | suitable |
| K$_4$ | concrete | 2.5 | 360 | 3.1 | 380 | suitable |
| | polycarbonate | 2.7 | 370 | 3.2 | 390 | suitable |

All the ruptures are cohesive, that is, they take place within the mass of the elastomers.

EXAMPLE 3

Two composition, M$_1$ and M$_2$, are prepared in accordance with the operating conditions described in Example 2. The various ingredients employed in the compositions M$_1$ and M$_2$, as well as the quantities used, are given in Table VI:

TABLE VI

| Ingredients used | M$_1$ | M$_2$ |
|---|---|---|
| α,ω-Dihydroxy-dimethylmethylethylpolysiloxane oil consisting of dimethylsiloxy and methylethylsiloxy units whereby the numerical ratio between the units is 94/6, viscosity 30,000 cps at 25° C. | 100 | |
| α,ω-Dihydroxy-dimethylmethylchloromethylpolysiloxane oil consisting of dimethylsiloxy and methylchloromethylsiloxy units whereby the numerical ratio between the units is 92/8, viscosity 40,000 cps at 25° C. | | 100 |
| α,ω-Bis-trimethylsiloxy-dimethylpolysiloxane oil, viscosity 20 cps at 25° C. | 30 | 20 |
| 60% toluene solution of a resin consisting of (CH$_3$)$_3$SiO$_{0.5}$ and SiO$_2$ units whereby the numerical ratio between the units is 0.56/1, and containing 1.5% of hydroxyl groups. | 56 | 46 |
| Copolymers consisting of (CH$_3$)$_3$SiO$_{0.5}$, (CH$_3$)$_2$SiO and CH$_3$SiO$_{1.5}$ units whereby the numerical ratio between the units is 3/70/27, and containing 2.7% of hydroxyl groups. | 8 | 12 |
| Diphenylsilanediol. | 3 | 2 |
| Pyrogenic silica of specific surface area 200 m$^2$/g treated with hexamethyldisilazane. | 20 | 22 |
| Methyl silicate. | 8 | 10 |
| Ethyl titanate | 1 | |
| Titanium chelate of the formula: $[(CH_3)_2CHO]_2Ti\left[\begin{array}{c}O=C\diagdown\\ \phantom{O=}CH\\ O-C\diagup\\ \phantom{O-}CH_3\end{array}\right]_2$ with CH$_3$ groups | 2 | |
| Titanium chelate of the formula: $\begin{array}{c}CH_2-O\\ CH_2\phantom{-O}\diagdown\\ \phantom{CH_2-}CH_2-O\end{array}Ti\left[\begin{array}{c}O=C\diagdown\\ \phantom{O=}CH\\ O-C\diagup\\ \phantom{O-}CH_3\end{array}\right]_2$ with CH$_3$ groups | | 3 |

Samples of these two compositions are deposited in a layer of 2 mm thickness on glass surfaces previously coated with an anti-adherent agent. The whole is exposed to ambient atmosphere, then the tack-free and mold release times are measured for the rubbery films formed; the Shore hardness in accordance with the standard specification form NF 51-109 and their tensile strength (and corresponding elongation) in accordance with the standard specification form NF T 46-002, are also measured on rubbery films released 7 days previously and left for this period exposed to the atmosphere.

The results of these measurements are assembled in Table VII below:

TABLE VII

| Elastomers obtained by curing of the compositions | Tack-free time | Mold Release time | Mechanical properties on film of 2 mm thickness | | |
|---|---|---|---|---|---|
| | | | Shore Hardness | Tensile Strength, in kg/cm$^2$ | Corresponding elongation in % |
| M$_1$ | 1 hr. 30 min. | 13 hrs. | 36 | 51 | 420 |
| M$_2$ | 1 hr. 40 min. | 15 hrs. | 41 | 50 | 440 |

Furthermore, samples of the compositions M$_1$ and M$_2$ are spread, in a layer of 1 mm thickness, onto plates of dimensions 50 × 25 × 2 mm which have been degreased; the coating takes place over half of one of the surfaces of each plate, namely over a surface area of dimensions 25 × 25 mm$^2$. The materials of the plates are chosen from steel, copper, polyethylene terephthalate, polyvinyl chloride, agglomerated asbestos and silicone rubber.

Plates of the same kind are assembled 2 by 2, half-overlapping, and coated face against coated face, and then left for 7 days exposed to the atmosphere. The shear strength of the bonds is then measured using a tensometer. It is found that all the ruptures are cohesive, that is, they occur in the mass of the elastomers which provide the bond.

EXAMPLE 4

The compounds indicated below are introduced into a malaxator (their order of introduction corresponds to the order in which they are listed): 100 parts of an α,ω-dihydroxy-dimethylpolysiloxane oil having a viscosity of 400,000 cps at 25° C, 25 parts of toluene solution containing 60% of a resin which consists of (CH$_3$)$_3$SiO$_{0.5}$ and SiO$_2$ units, whereby the numerical ratio between the units is 0.65/1, and this resin comprises 2.1% of hydroxyl groups, 50 parts of an α,ω-bistrimethyl-siloxy-dimethylpoly siloxane oil having a viscosity of 20 cps at 25° C, 6 parts of an α,ω-dihydroxy-methylphenyl-polysiloxane oil consisting of CH$_3$(C$_6$H$_5$)SiO units, having a viscosity of 500 cps at 25° C, and containing 4% of hydroxy groups, 17 parts of pyrogenic silica of specific surface are 130 m$^2$/g and 25 parts of calcium carbonate of average particle diameter 0.15 microns.

The agitated mixture in the malaxator is heated to 130° C., and is then maintained at this temperature for 2 hours and 30 minutes, at a pressure of 10 mm Hg. After this treatment the heating is stopped. When the temperature has fallen to about 50° C., 12 parts of ethyl silicate and 2.65 parts of ethyl titanate are added to the contents of the malaxator; the whole is then malaxated for 1 hour.

The composition obtained is homogeneous and thixotropic. Samples of this composition are spread (in the form of a layer of 2 mm thickness), onto polyethylene plates and exposed to ambient atmosphere. It is found that the deposited layer is tack-free at the end of 40 minutes and that it becomes converted to a rubbery film easily detachable from the plate, after 7 hours.

By way of comparison, an identical composition to the previous composition is prepared, with the exception that 25 parts of the toluene solution containing 60% of the resin with (CH$_3$)$_3$SiO$_{0.5}$ and SiO$_2$ units are replaced by 13 parts of the same resin solution. In this way a composition vis-a-vis the U.S. Pat. No. 3,922,246 and No. 3,965,280 is obtained. It is found that samples of this composition, which are exposed to ambient atmosphere, are tack-free after 3 hours and are converted to a rubbery film after 20 hours. These time periods are therefore clearly higher than those recorded for the samples of the composition containing 25 parts of the toluene solution containing 60% of the organosilicon resin.

While the invention has now been described in terms of certain preferred embodiments, and exemplified with respect thereto, the skilled artisan will appreciate that various modifications, changes, substitutions, and omissions may be made without departing from the spirit thereof. Accordingly, it is intended that the scope of the present invention be limited solely by that of the following claims.

What is claimed is:

1. An organosilicon composition which is storage-stable in the absence of water and curable into elastomers under ambient conditions, and which comprises:
    (a) 100 parts by weight of at least one α,ω-di(hydroxy) diorganopolysiloxane polymer [A] having a viscosity of at least 600 cps at 25° C and essentially consisting of diorganosiloxy units of the formula R$_2$SiO wherein each substituent R is the same or different and represents an alkyl or halogenoalkyl group containing 1 to 8 carbon atoms, a cycloalkyl or halogenocycloalkyl group containing 3 to 8 carbon atoms, an alkenyl group containing 2 to 4 carbon atoms, an aryl or halogenoaryl group containing 6 to 8 carbon atoms or a cyanoalkyl group containing 3 to 4 carbon atoms, and wherein at least 50% of all the substituents R represent methyl;
    (b) 15 to 50 parts by weight of at least one organosilicon resin [B] essentially consisting of units of the formulae SiO$_2$ and R'$_3$SiO$_{0.5}$, wherein each substituent R' is the same or different and represents an alkyl or halogenoalkyl group containing 1 to 3 carbon atoms, a vinyl group or a phenyl group, and wherein the molar ratio between the R'$_3$SiO$_{0.5}$ units and the SiO$_2$ units is from 0.4:1 to 1.2:1;
    (c) 2 to 25 parts by weight of at least one alkoxylated organosilicon compound [C] which is selected from the group consisting of:
       monomers [F] of formula (C$_1$), R$_x$Si[(OCH$_2$CH$_2$)$_a$OR"]$_{4-x}$, wherein R is as defined above for the α,ω-di(hydroxy) diorganosiloxane polymers [A], R" represents an alkyl group containing 1 to 4 carbon atoms, "a" represents zero or 1, and "x" represents zero, 1 or 2;
       polymers [G] obtained by partial hydrolysis of monomers of formula Si(OR")$_4$, wherein R" is as defined above for the compounds [F], with the proviso that, when employing those difunctional monomers of the formula [F] wherein x is 2, the same are necessarily admixed with either other monomers of the formula [F] wherein x is either 0 or 1, and/or with the aforesaid polymers resulting from partial hydrolysis of the Si(OR")$_4$ monomers, and with the further proviso that such admixtures comprise at most 40% of difunctional monomers; and (d) 0.5 to 18 parts by weight of at least one organic titanium derivative [D] which is selected from the group consisting of:

monomers [H] of the formula Ti[OCH$_2$CH$_2$)$_b$OR''']$_4$, wherein b represents zero, 1 or 2, and R''' represents an alkyl group which contains 2 to 12 carbon atoms if b equals zero and which contains 1 to 4 carbon atoms if b equals 1 or 2, polymers [I] obtained by partial hydrolysis of monomers of the formula Ti(OR''')$_4$, wherein R''' represents an alkyl group containing 2 to 12 carbon atoms, and titanium chelates [J] which are selected from the group of compounds of formula (D$_1$)

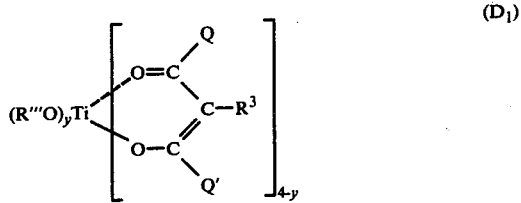

wherein R''' represents an alkyl group containing 2 to 12 carbon atoms and y is 2 or 3, Q represents hydrogen, an alkyl group containing 1 to 4 carbon atoms, a phenyl group, an alkoxy group containing 1 to 5 carbon atoms or a dialkylamino group, the alkyl groups of which each contain 1 to 3 carbon atoms, R$^3$ represents hydrogen, methyl, chloromethyl or acetyl, Q' represents an alkyl group containing 1 to 5 carbon atoms or chloromethyl, or wherein Q is hydrogen or an alkoxy group containing 1 to 5 carbon atoms, R$^3$ and Q' together with the carbon atoms from which they depend can be linked to form a phenyl nucleus, and compounds of formula (D$_2$)

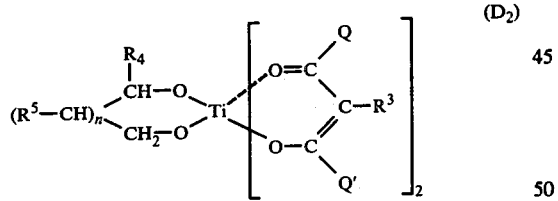

wherein R$^4$ and R$^5$ each are the same or different and each represents hydrogen or methyl, n represents zero, 1 or 2, and Q, Q' and R$^3$ are as defined above for formula (D$_1$).

2. The composition as defined in claim 1, wherein the organosilicon resin [B] contains 0.5 to 6% of hydroxyl groups which are bonded to silicon atoms.

3. The composition as defined in claim 1, wherein the α,ω-di(hydroxy) diorganopolysiloxane polymer [A] exhibits a viscosity of between 600 cps and 50 million cps.

4. The composition as defined in claim 3, wherein the α,ω-di(hydroxy) diorganopolysiloxane polymer [A] exhibits a viscosity of between 5,000 cps and 30 million cps.

5. The composition as defined in claim 1, which further comprises up to 100 parts by weight of a filler per 100 parts by weight of the α,ω-di(hydroxy) diorganopolysiloxane polymer [A].

6. The composition as defined in claim 1, which further comprises up to 150 parts by weight per 100 parts by weight of the α,ω-di(hydroxy) diorganopolysiloxane polymer [A] of additional ingredients selected from the group consisting of α,ω-bistriorganosiloxy-diorganopolysiloxane and α-hydroxy-ω-triorganosiloxy-diorganopolysiloxane polymers, having a viscosity of at least 10 cps at 25° C, wherein the organic radicals which are bonded to the silicon atoms of these polymers are selected from the group consisting of methyl, vinyl and phenyl radicals, and wherein at least 60% of these organic radicals represent methyl.

7. The composition as defined in claim 1, wherein the alkoxylated organosilicon compound [C] is selected from the group consisting of methyltriethoxysilane, chloromethyltriethoxysilane, methyl-tris-β-methoxyethoxy-silane, vinyltriethoxysilane, 2,2-dichlorocyclopropylmethyldiethoxysilane, chloromethylmethyldiethoxysilane, methyl silicate, ethyl silicate, n-propyl silicate and ethyl polysilicate containing 40% of silica.

8. The composition as defined in claim 1, wherein the organic titanium derivative [D] is selected from the group consisting of ethyl titanate, butyl titanate, butyl polytitanate containing 33% of titanium oxide and the titanium chelates of the formulae

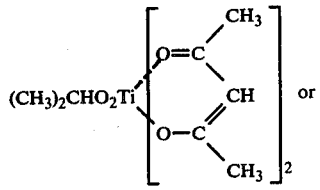

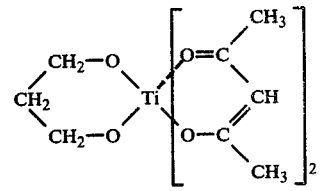

9. The composition as defined in claim 1, which comprises 3 to 20 parts by weight of the organosilicon compound [C].

10. The composition as defined in claim 1, which comprises 0.8 to 15 parts by weight of the organic titanium derivative [D].

11. The cross-linked elastomer comprising the cured composition as defined in claim 1.

12. A shaped article comprising a substrate, said substrate having been jointed, layered, coated, impregnated or repaired with an elastomer as defined in claim 11.

13. The method for preparing an organopolysiloxane elastomer comprising water-curing the composition as defined in claim 1 under ambient conditions.

* * * * *